April 7, 1931.  F. S. HAAS  1,799,687
CASH REGISTER
Original Filed March 10, 1922  8 Sheets-Sheet 2
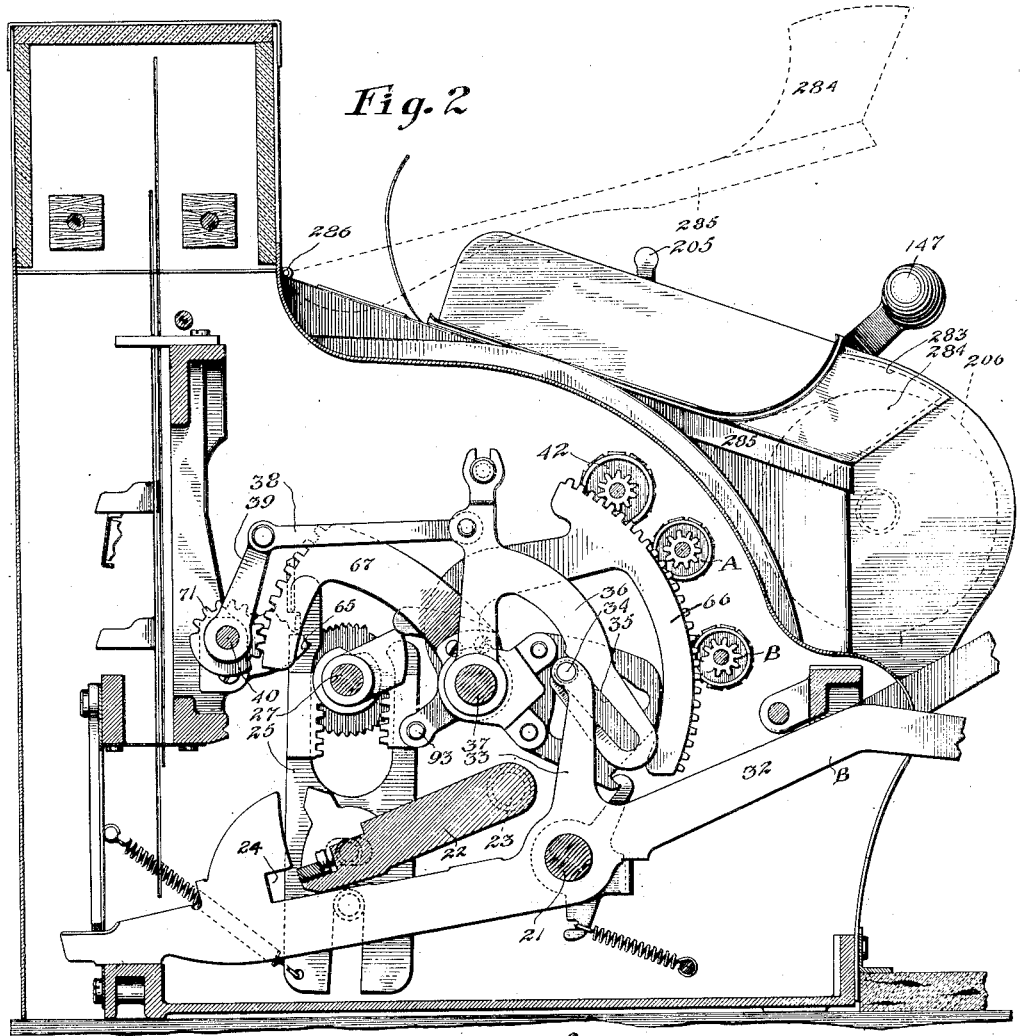
Fig. 2
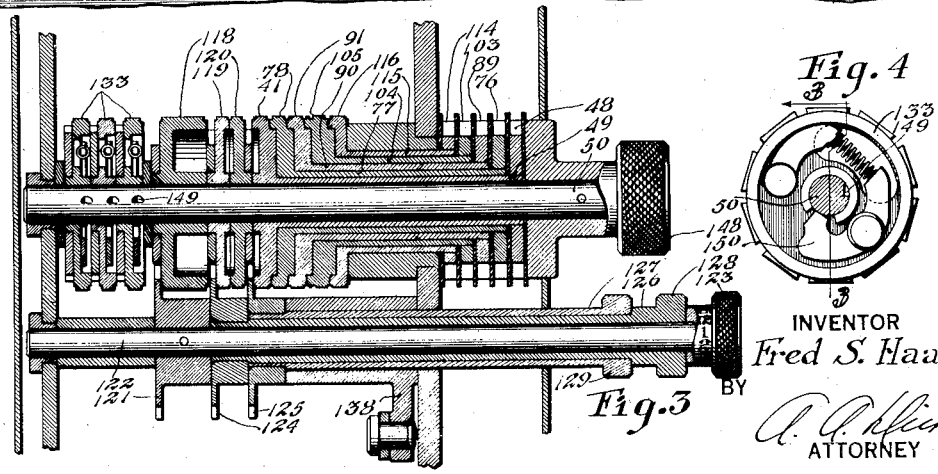
Fig. 3
Fig. 4
INVENTOR
Fred S. Haas
BY
ATTORNEY April 7, 1931. F. S. HAAS 1,799,687

CASH REGISTER

Original Filed March 10, 1922 8 Sheets-Sheet 4

INVENTOR
Fred S. Haas
WITNESS
BY
ATTORNEY

April 7, 1931.   F. S. HAAS   1,799,687
CASH REGISTER
Original Filed March 10, 1922   8 Sheets-Sheet 5

WITNESS

INVENTOR
Fred S. Haas
BY
ATTORNEY

April 7, 1931.  F. S. HAAS  1,799,687
CASH REGISTER
Original Filed March 10, 1922  8 Sheets-Sheet 6
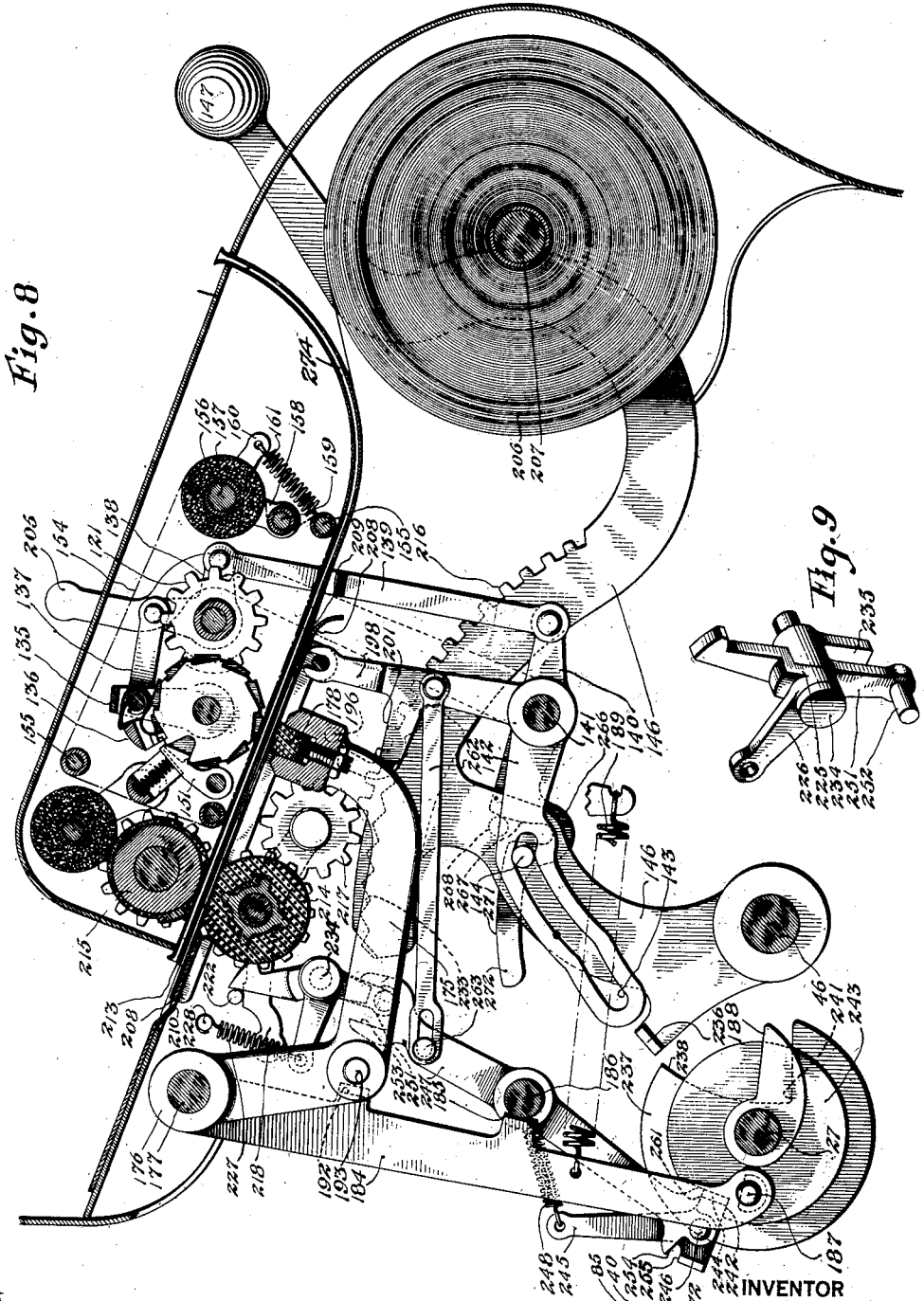

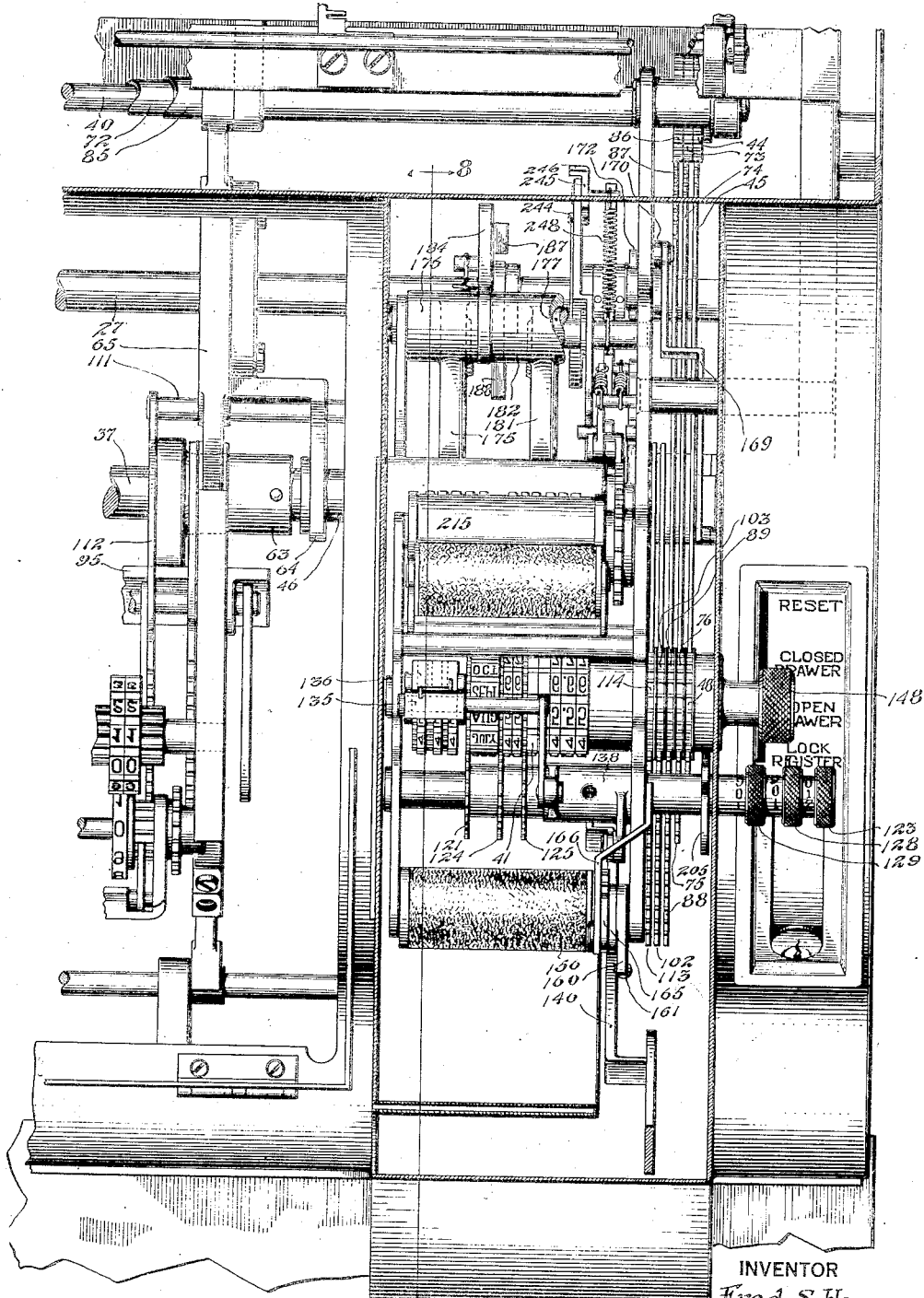

April 7, 1931.   F. S. HAAS   1,799,687
CASH REGISTER
Original Filed March 10, 1922   8 Sheets-Sheet 8
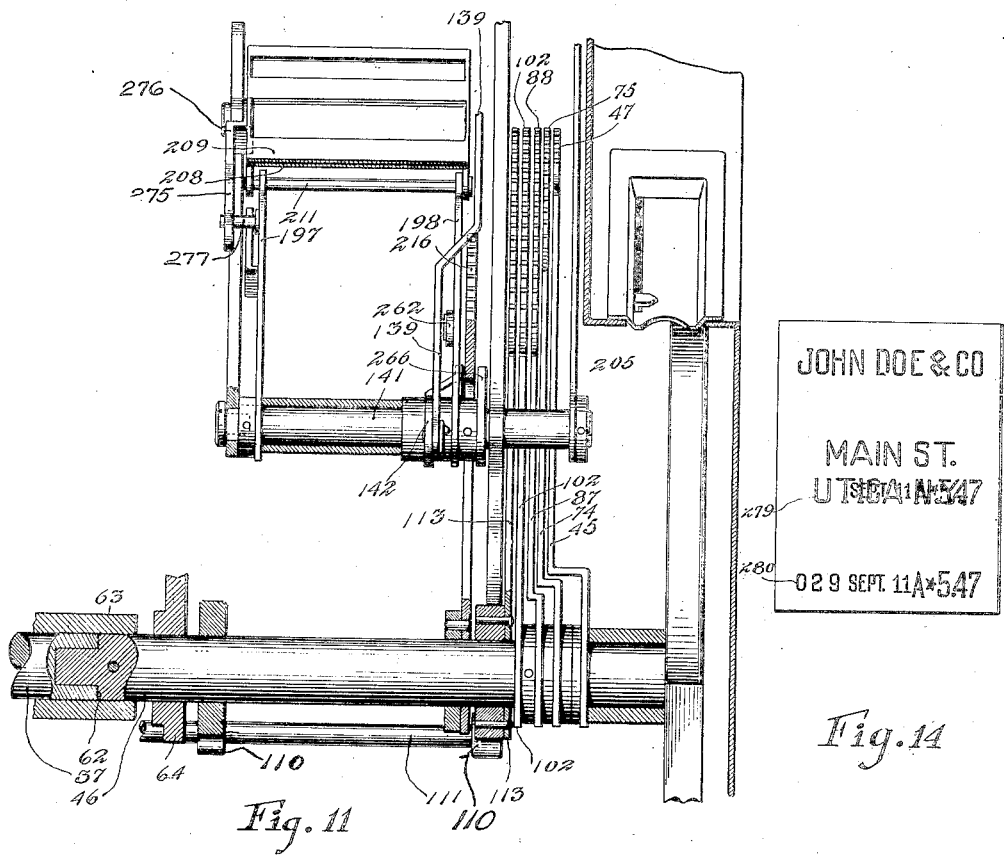
Fig. 11   Fig. 14
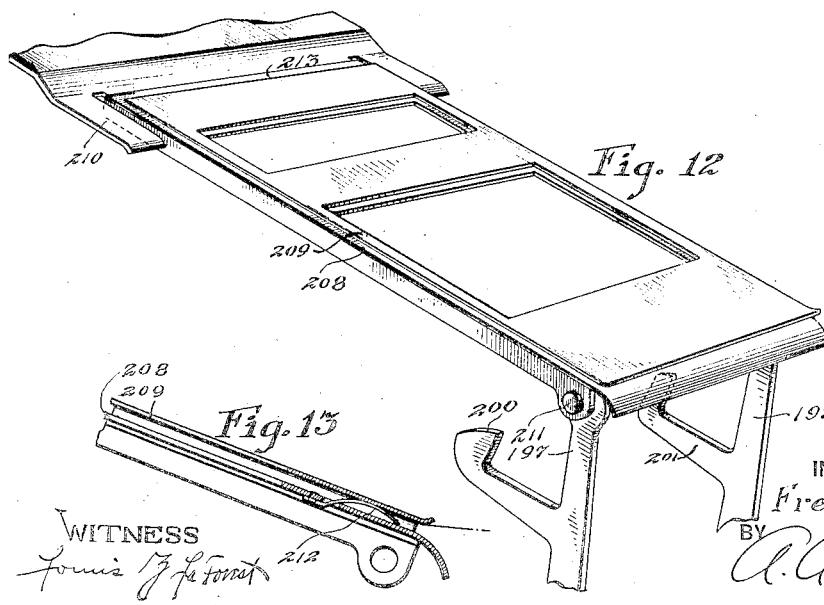
Fig. 12
Fig. 13
WITNESS
INVENTOR
Fred S. Haas
BY
ATTORNEY Patented Apr. 7, 1931

1,799,687

UNITED STATES PATENT OFFICE

FRED S. HAAS, OF HERKIMER, NEW YORK, ASSIGNOR TO REMINGTON ARMS COMPANY, INC., A CORPORATION OF DELAWARE

CASH REGISTER

Application filed March 10, 1922, Serial No. 542,671. Renewed March 11, 1927.

This invention relates generally to improvements in cash registers and has particular reference to improvements in the printing mechanisms of such machines.

In the accompanying drawings the improvements are shown applied to a machine of the same general type as is shown and described in U. S. application, Serial No. 263,125, filed Nov. 19, 1918, by Frederick L. Fuller. As will be more clearly apparent later on, however, the improvements are capable of being applied to or embodied in a number of other forms of cash registers and accounting machines without departing from the spirit of the invention.

A broad object of the invention is to provide a printing mechanism for printing and and issuing checks or printing upon sales slips inserted to receive impressions, preferably with devices whereby the mechanism may be conditioned for either check printing or sales slip printing.

Another object of the invention is to provide interlocking devices effective to insure correct operation of the improved machine as a whole when the printing mechanism is in check printing condition; and associated controlling devices by means of which the interlocking devices may be disabled or rendered ineffective when the printing mechanism is changed to sales slip printing condition or when it is desired for some reason to be able to operate certain parts of the mechanism without either printing and issuing a check or printing upon a sales slip.

Another object is to provide a simple and very effective way of preventing the insertion of a sales slip when the printing mechanism is not in sales slip printing condition.

In the present preferred embodiment the printing mechanism comprises devices for printing certain data, including devices for printing the serial or consecutive numbers upon the checks, and mechanism whereby changing the printing mechanism to a sales slip printing condition will prevent actuation of or printing from the consecutive number. The provision of suitable mechanism for so controlling the consecutive numbering devices is still another object of the invention.

With the foregoing and other objects in view, the invention consists in the novel combination and arrangement of parts, the features of novelty of which are pointed out in appended claims, and a preferred embodiment of which is shown in the accompanying drawings.

Of said drawings;

Fig. 2 is a section on the line 2—2 in Fig. 5.

Fig. 3 is a section on the line 3—3 (Fig. 4) through the type carriers and some of the connections for operating or setting them.

Fig. 4 is a detail of one of the consecutive number type carriers.

Fig. 8 is a section through the mechanism on the line 8—8, Fig. 10.

Fig. 9 is a detail of a part of the full stroke mechanism and one of the aligning devices for holding the check feeding mechanism in correct operating relation with certain others of the parts.

Fig. 10 is a top plan view of the improved printing mechanism and of some of the operating connections and associated accounting mechanism.

Fig. 11 is a front view of a portion of the type carrier setting connections and some of the check paper supporting mechanism.

Fig. 12 is a detail of the check paper chute or table and some of the connections for imparting movement to it.

Fig. 13 is a partial vertical section through the device shown in Fig. 12.

Fig. 14 shows one of the checks issued by the machine and how the machine overprints to obliterate or conceal impressions accidentally made on the check strip when the printing mechanism is operated under sales slip printing conditions.

Figure 1:
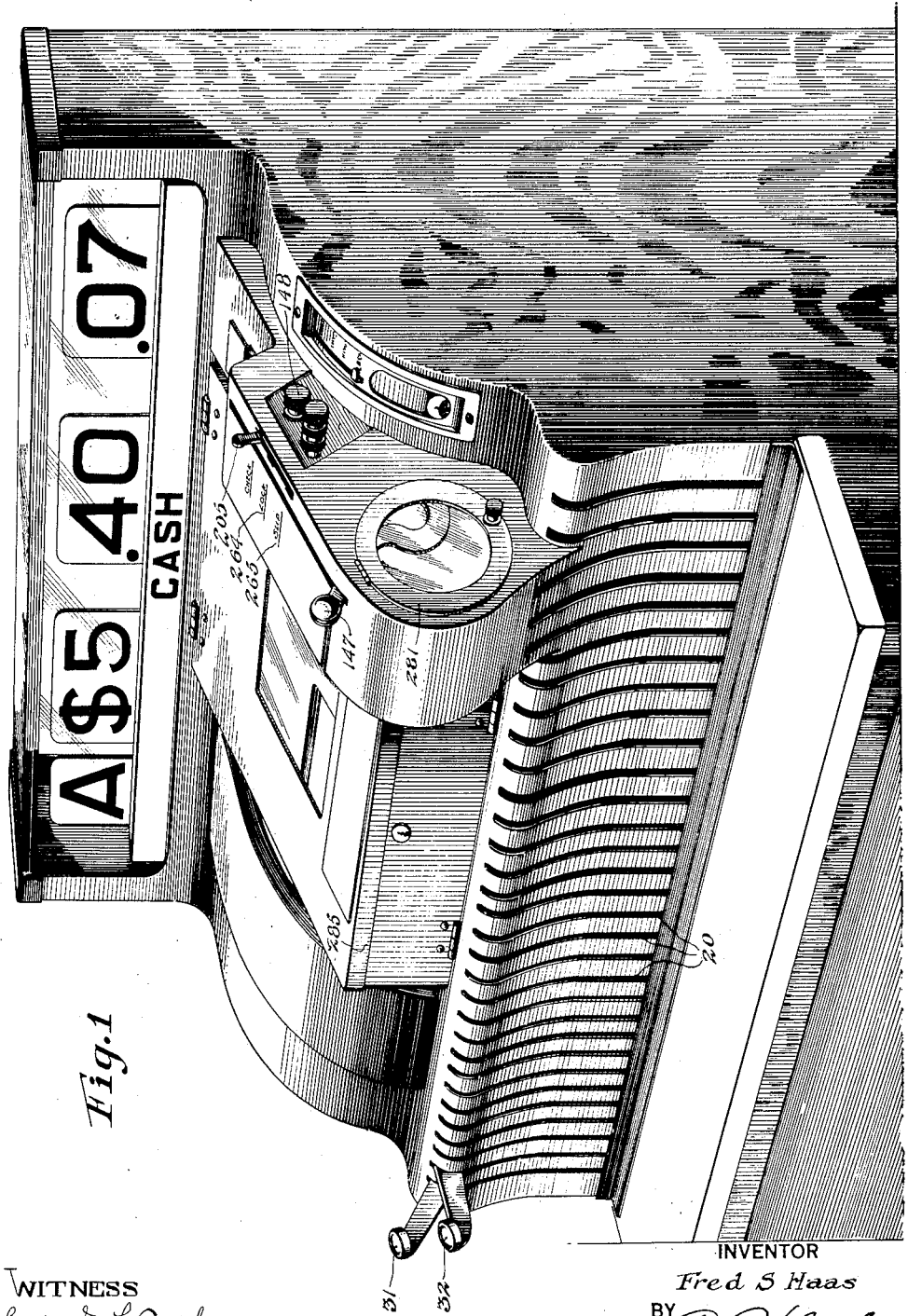
Fig. 1 is a perspective view of one of the improved machines with all but two of the keys omitted.

As shown in the drawings, the machine used to illustrate one embodiment of the invention is of the key operated type, that is, various functions, such as, indicating, registering, and printing are effected directly by operation of the keys. Addition of the present improvements does not materially affect the operation of such a machine in any of these respects, but when the keys are operated type carriers forming a part of the new mechanism are adjusted to represent the keys and impressions are then taken from the type carriers upon either a check strip or upon a sales slip depending upon which kind of printing the mechanism has been prepared to do.

In case the mechanism has been prepared or conditioned for check printing, after the keys have been operated and the characters representing them printed on the check strip a lever or handle is operated to feed a portion of the check strip containing the record of the keys operated to a position where it may be severed from the strip. The feeding operation is performed by a pair of co-operating rollers driven by the handle, one of which rollers is provided with inked type for printing advertising or other matter on the face of the check.

For certain classes of transactions, such as "charge" transactions, it is desirable to have the machine so constructed as to print upon an itemized "charge" slip a total of the items, thereby providing a way of insuring the making of a record of the transaction in the record retaining devices of the machine. The improved machine is provided with a slot into which sales slips may be inserted to receive impressions, provided that the mechanism has been prepared for sales slip printing. If it has not been so prepared the slot will be closed by an obstruction which prevents insertion of a slip, but this obstruction is automatically removed as an incident to conditioning the machine for printing upon sales slips.

In the present embodiment the work of conditioning the printer for different kinds of printing is performed by adjustment of manipulative devices comprising a lever which operates through suitable connections to lock the check feeding mechanism, withdraw the obstruction from the sales slip slot, and disable or render ineffective interlocking mechanism controlling the sequence of operation of the keys and the check feeding and printing mechanism.

The interlocking mechanism just referred to is so constructed that after a key or keys have been operated to print upon a check a second operation of the keyboard cannot be performed unless the check feeding mechanism is first operated. Operation of the feeding mechanism will affect the interlocking mechanism to free the keys for operation, but freeing them will at the same time affect the interlocking mechanism to prevent a second operation of the check feeding mechanism without an intervening operation of the keyboard.

Adjustment of the mechanism in preparation for slip printing frees the keys for successive operations without intervening operations of the check feeding mechanism. In fact, the feeding mechanism becomes locked so that it cannot be actuated. To print upon sales slips when the mechanism is in slip printing condition, all that is necessary is to insert the slips to a position where they may receive impressions from the type carriers and then depress the keys representing the items. This causes the items to be printed upon the slips, after which the slips are simply withdrawn from the machine.

The mechanism for controlling the condition of the printing mechanism is so constructed that it may be adjusted not only to prevent insertion of a sales slip, but also at the same time to prevent operation of the mechanism usually operated to print upon checks or sales slips. The reason for this is that it may at times be desirable to operate the keys of the machine without either issuing checks or printing upon sales slips. When in this non-printing condition the interlocking mechanism before referred to is thrown out of commission so that there is no interference with repeated or successive operations of the keyboard.

When the mechanism is operated under check printing conditions, a pair of impression hammers is operated to make the impression, one for printing the consecutive numbers and the other to print the date and description of the item. When the mechanism is adjusted to the non-printing condition both of the impression hammers are inoperative, while under slip printing conditions only the consecutive number impression hammer fails to operate. Under the condition last mentioned, therefore, the consecutive number type carriers do not print upon the inserted slips. And as the consecutive numbering devices are operated to add one directly by movement of the check feeding devices the number cannot be changed or increased because, it will be recalled, the feeding mechanism becomes locked when the printing mechanism is prepared for slip printing.

The feeding operation is as before stated, performed by a pair of co-operating rollers driven by a lever or handle, one of which rollers is provided with inked type for printing upon the face of the check. The machine in the drawings includes mechanism whereby when the printing mechanism is conditioned for printing upon the sales slips the check strip will be reversely moved to a position where, in case the keys should be operated without a sales slip in position, the impression from the type carriers will be made in the space usually printed upon by the printing roller. Then when the machine is changed to a check printing condition the check strip is restored to its normal relation with the printing and feeding rollers and subsequent operation of the feeding and printing mechanism will overprint or obliterate the incorrect type carrier impression, and the impression for the transaction upon which the check is issued will occur in the correct space on the check. This mechanism is part of an invention by a party other than the present applicant and, while it is shown more or less in detail, no claims to it are made in this case.

The operating keys work in slots 20 (Fig. 1) in the machine casing and are pivoted on a rod 21 (Fig. 2) extending across the machine. Resting upon all of the keys is a key coupler 22 pivoted as at 23 in the side frames of the machine. When the outer ends of the keys are depressed the key coupler is rocked clockwise on its pivot and engages with notches 24 in the rear portions of the keys. The construction and purposes of such key coupler mechanism are well known in the art and need not be described in detail.

Connected to the key coupler is a double rack 25, the connection being such that as the key coupler 22 is rocked by the keys the rack 25 is raised and lowered. The teeth of the double rack engage a gear 26 first on one side and then on the other in such a way that a complete movement of the key coupler 22 and double rack 25 will effect a complete rotation of the gear 26 and shaft 27 to which the gear is secured. The shaft 27 carries cams and other devices for operating various parts of the mechanism. The mechanism for effecting rotation of the shaft has not been described in detail because it is old and so well known, as shown for example by the patent to Cleal 786,346, April 4, 1905.

The two keys shown in Fig. 1, designated as 31 and 32, are the keys for two clerks or two departments. For convenience they will be referred to as the A and B clerks' keys. They are connected with or operate mechanism for controlling engagement of either the totalizer A or the totalizer B, Fig. 2, with operating segments of the differential mechanism. The totalizer engaging mechanism is not directly involved in the present invention, and is not shown or described in this application. A showing and description of one form thereof may be found, however, in the Fuller application above mentioned.

The A key 31 in addition to its totalizer selecting or engaging function operates an indicator and does certain other work, but is not connected to devices for setting a type carrier. The original machine has, however, a type carrier for printing either the letter A or the letter B and, in addition thereto, a similar type carrier is included in the improved mechanism. The position of these two type carriers is controlled by the B key 32.

Figure 5:
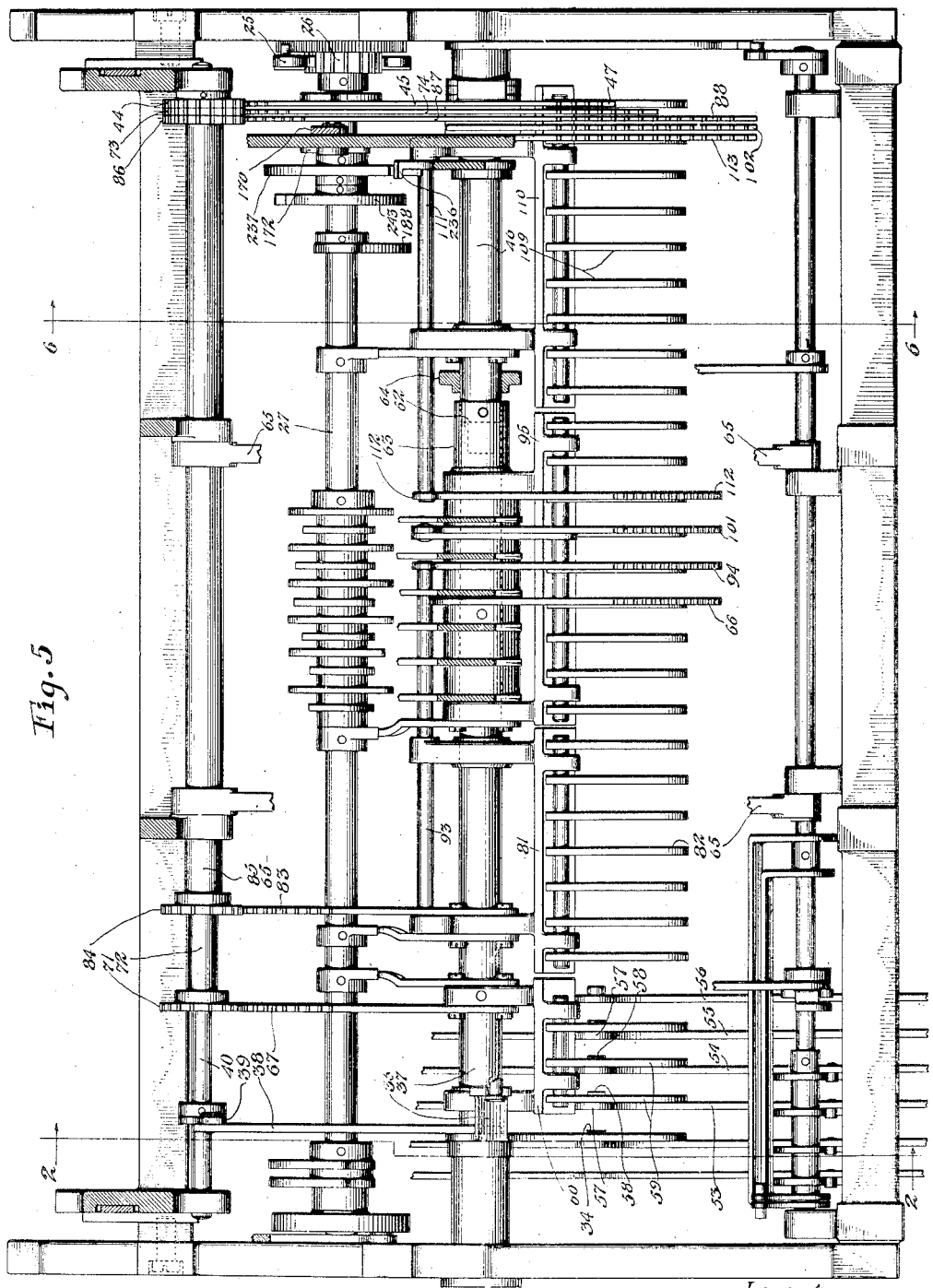
Fig. 5 is a plan view of some of the differential devices and shows particularly the type carrier adjusting connections.

As shown in Fig. 2 the B key 32 has an upwardly extending arm 33 carrying a stud 34 engaging a slot 35 in a member 36 loose on a shaft 37. The member 36 is connected by a link 38 with an arm 39 secured to a shaft 40 which is, as shown in Fig. 5, journaled in lugs on the back frame of the machine. It is apparent that when the B key 32 is depressed it will act through the connections described to rock the shaft 40 counter-clockwise (Fig. 2) and that when the key 32 returns to its undepressed position the shaft 40 will be restored to its starting point. This movement of the shaft 40 effects the setting of a type carrier 41 (Fig. 10) in the improved mechanism for printing either the letter A or the letter B. The A and B type carrier 42, Fig. 2, in the old mechanism is given a corresponding movement by connections which are neither shown nor described in the present case.

Figure 7:
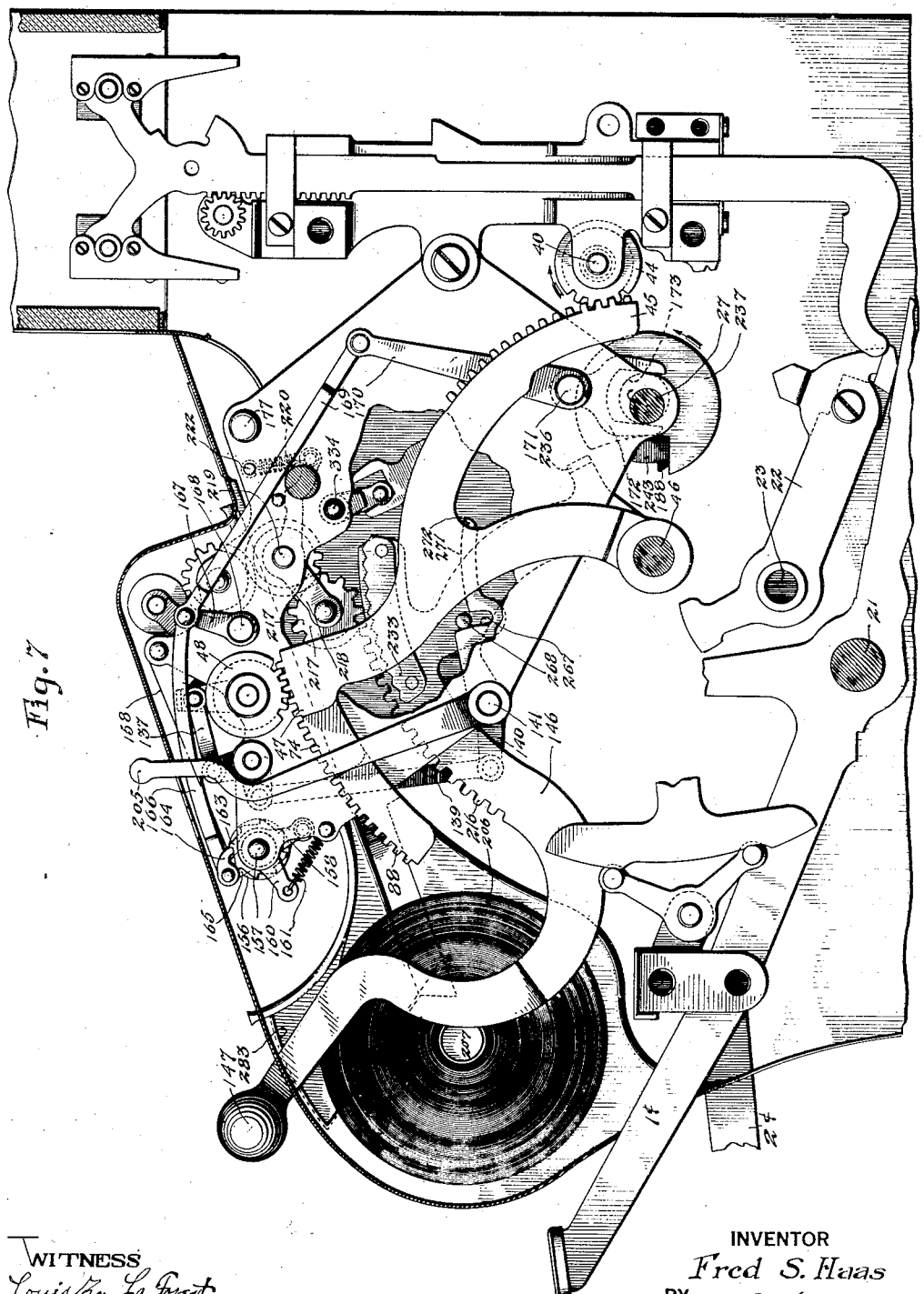
Fig. 7 is a partial vertical section of the improved machine taken inside of the right hand frame of the machine.

The connections for transmitting movements of the shaft 40 to the new type carrier just mentioned comprise a gear 44, Figs. 5, 7 and 10, secured to the shaft 40 and meshing with the teeth of a segment 45 loose on a shaft 46 in axial alignment with the previously mentioned shaft 37. An extension 47 of the segment 45 is provided with teeth meshing with the teeth of a gear 48 (see also Fig. 3) secured to a tube 49 loose on a shaft 50 and integral with the type carrier 41 provided with the A and B type.

The illustrative machine also has four special or transaction keys for "Paid out", "Charge", "Received on account", and "No sale" items designated respectively by the numerals 53, 54, 55, and 56, (Fig. 5). The "No sale" key 56 has certain functions such as operating drawer release mechanism, but it does not set a type carrier. There is a carrier provided for printing the characters designating the various special keys, but it is normally held in a position where it prints the character representing both "No sale" and "Cash" and is shifted to any one of the other three positions by one of the keys 53, 54 or 55. Each of these keys is provided with an upwardly extending arm 57 like the arm 33, Fig. 2, of the B key 32, carrying a stud 58, Fig. 5, engaging slots in plates 59 rigidly mounted in a frame 60 secured to the shaft 37. The shaft 37 is journaled at its left end in the left side frame of the machine and terminates at its right end at the point marked 62, Fig. 5. This point of termination is within a hub 63 secured to the shaft 46, previously mentioned, which shaft is rotatably supported by the right hand machine frame and by a bracket 64 on a frame 65 (see also Fig. 10), and which in the illustrative machine supports the totalizers and record strip printing mechanism. The reason for having the separate shafts 37 and 46 instead of a single shaft will be clear later on.

Secured to the shaft 37 is a segment 66 (Figs. 2 and 5) for setting the special transaction type carrier in the old recording mechanism, and rigid with the frame 60 is a segment 67. The slots in the plates 59 carried by the frame 60 are graduated so that each of the keys will impart a different degree of movement to the frame and consequently to the segments 66 and 67.

The segment 67 meshes with a gear 71 secured to a tube 72 surrounding the shaft 40 and carrying at its other end a gear 73 (see also Fig. 10) meshing with a segment 74 loose on the shaft 46 and having a toothed portion 75 meshing with a gear 76 secured to a tube 77 (Fig. 3) surrounding the tube 49 and integral with a type carrier 78 having on its periphery type for printing characters to represent the various classes of transactions. From the foregoing it is clear that the differential movements of the frame 60 by the associated keys will affect corresponding movements of the type carrier 78 to its various printing positions.

To the right, (Fig. 5) of the frame 60 previously described is a rock frame 81 loose on the shaft 37. Rigid with the frame 81 is a set of cam plates 82 having differently inclined slots (not shown) acted upon by studs on the keys in the same way as previously described in connections with the special keys 53, 54, and 55. The frame 81 is provided with seven of the cam plates so it is apparent that it can accommodate only a like number of keys. These keys are for entering dollar items running from $1.00 to $7.00.

Rigid with the frame 81 is a segment 83 meshing with a gear 84 secured to a tube 85 surrounding the tube 72. Fastened to the other end of the tube 85 is a gear 86 meshing with the teeth of a segment 87 (see also Fig. 10) loose on the shaft 46. Rigid with the segment 87 is a segment 88 meshing with the teeth of a gear 89 attached to a tube 90 (Fig. 3) integral with a type carrier 91 for printing characters to represent the dollars.

Mounted in extensions of the rock frame 81 is a rod 93 (Fig. 5) extending beyond the frame to a segment 94 loose on the shaft 37. This segment is for setting the dollar type carrier in the old recording mechanism and actuating the dollars wheels in the totalizers. It is clear that differential movement of the rock frame 81 under control of its associated keys will effect corresponding movements of the segment 94 and of the dollar type wheel 91.

To the right (Fig. 5) of the dollar differential frame 81 is a differential frame 95 operated by the 10¢ to 90¢ keys to impart different degrees of movement to the associated mechanism. The frame 95 is at its left side, loose upon the shaft 37 and at its right side is integral with the hub 63 which, as before stated, is fastened to the shaft 46. Rigid with the frame 95 is a segment 101 for operating the dimes type carrier in the recording mechanism and the dimes registering wheels in the totalizers. Secured to the shaft 46 near its right end is a segment 102 (see also Fig. 11) meshing with a gear 103 (Fig. 3) connected by a tube 104 to a type carrier 105 for printing characters representing the 10¢ to 90¢ amounts.

The penny keys operate upon cam plates 109 (Figs. 5 and 6) fastened in a differential frame 110, in the same manner as hereinbefore described in connection with other groups of keys. There are nine of the penny keys, two of them being shown in Fig. 6, and their connections with the differential frame 110 are such that by selective operation of them the frame may be moved to nine different positions. Secured in extensions of the frame 110 is a rod 111 engaging a segment 112 loose upon the shaft 37. This segment operates the penny type carrier in the recording mechanism and the corresponding wheels in the totalizers. Secured to the right hand side of the differential frame 110 is a segment 113, Figs. 10 and 11, engaging a gear 114, Fig. 3, connected by a tube 115 to a type carrier 116 for printing the characters representing 1¢ to 9¢.

In axial alignment with the type carriers 41, 78, 91, 105 and 116, are type carriers 118, 119, and 120 (Fig. 3) for designating dates. Meshing with the teeth of a gear rigid with the type carrier 118 is a gear 121 secured to a shaft 122. At its right hand end the shaft is provided with a knurled knob 123 by means of which the type carrier 118 may be adjusted to the different positions. The printing face of the type carrier bears type for printing characters representing the months. The type carriers 119 and 120 are provided with similar gears meshing with gears 124 and 125 rigid with tubes 126 and 127 provided with setting knobs 128 and 129 by means of which the type carriers 119 and 120 may be adjusted to represent the various days of the month.

Mounted upon the shaft 50 and, therefore, in axial alignment with the other type carriers just mentioned are three type carriers 133 for printing the consecutive numbers upon the checks. These carriers and the mechanism for operating them are of the usual deep notch transfer type. A bail 135, (Figs. 6, 8 and 10) loose upon the shaft 50 supports the usual operating and carrying pawl 136. One side of the bail 135 is connected by a link 137 to a bellcrank 138 loose on the tube 127 and connected by a link 139 with an arm 140 loose on the shaft 141, but rigid with an arm 142. The arm 142 has a cam slot 143 engaging a stud 144 on the side of the check feeding lever 146. This lever, which has an operating handle 147, is moved each time that a check is issued and consequently acts through the stud 144, cam slot 143 and other connections described to oscillate the bail 135 a sufficient distance for the pawl 136 to add one on the consecutive numbering type carriers. Spring pressed pawls 151 retain the numbering carriers in their various positions.

The consecutive numbering type carriers may be turned to zero whenever desired by turning a knob 148 (Fig. 3) secured to the shaft 50 to engage notches 149 in the shaft with the points of pawls 150 (Fig. 4) mounted within the type carriers.

Figure 6:
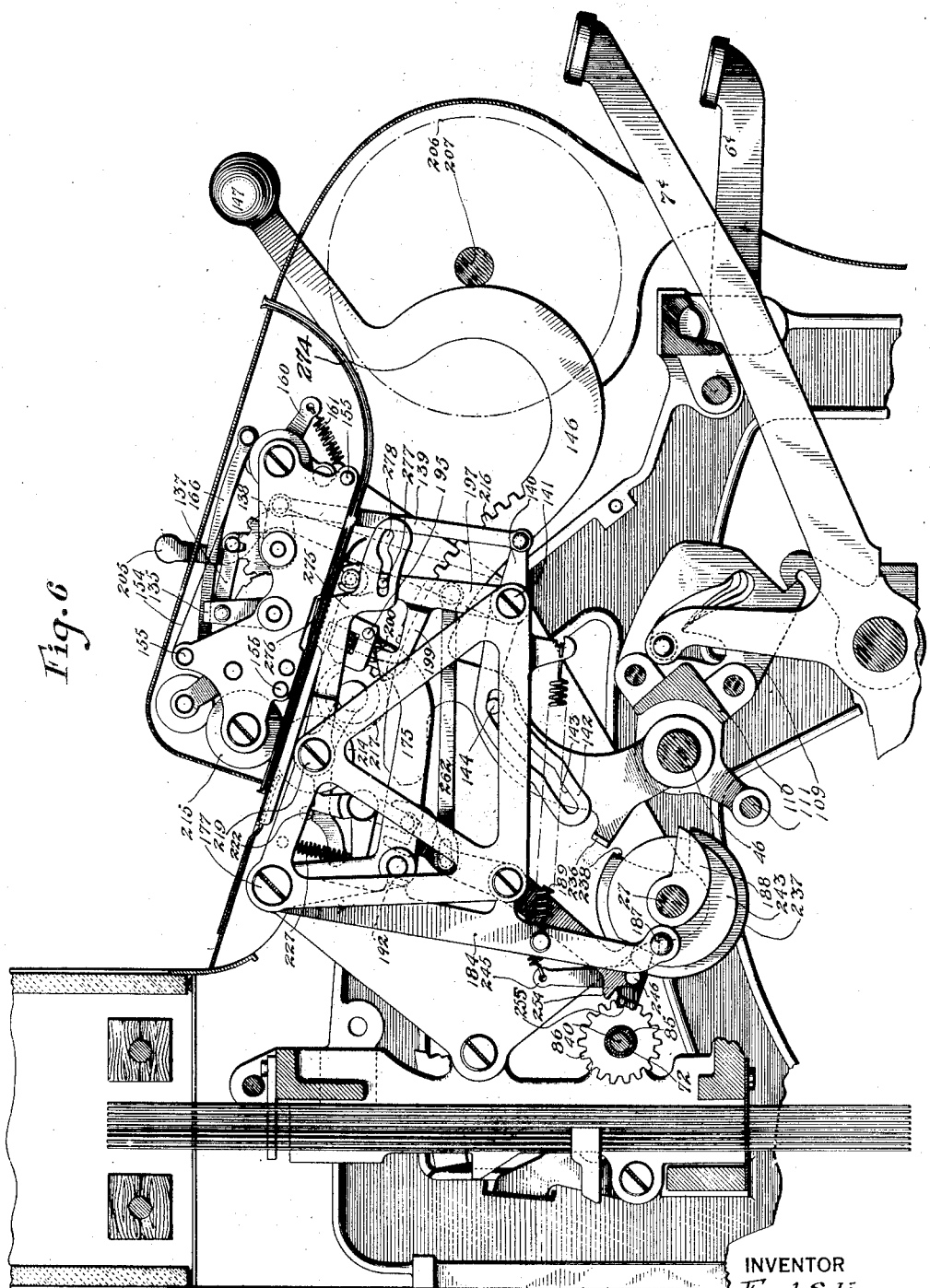
Fig. 6 is a section through the machine on the line represented by 6—6, Fig. 5.

The ink for printing from the consecutive number type carriers and the other type carriers in axial alignment therewith is supplied by an inked ribbon 154, Figs. 6, 7 and 8, passing below the type carriers around supporting rollers 155, and a roller 156 of felt or other material capable of carrying an ink supply for the ribbon. The roller 156 is rotatable on a rod 157 and pivoted on this rod at one end of the roller 156 is an arm 158 carrying another roller 159. Integral with the arm 158 is an arm 160 connected by spring 161 with the rod supporting the adjacent roller 155. The ribbon passes back of the roller 159 so that the spring 161 can serve to maintain a certain amount of tension upon the ribbon.

The ribbon is given a step of movement at each operation of the machine. This not only prevents successive impressions through the same portion of the ribbon, but it also serves to bring the different portions of the ribbon into contact with the roller 156 and thereby permit it to moisten or apply ink to the ribbon. The mechanism for driving the ribbon comprises a ratchet disk 163, Fig. 7, rigid with the roller 156 and a pawl 164 carried by an arm 165 loose on the rod 157. The arm 165 is connected by a link 166 with an arm 167 pivoted at 168. The arm 167 is in turn connected by a link 169 with an arm 170 secured to a short shaft 171 journaled in one of the supporting plates of the mechanism. Secured to the shaft 171, but at the other side of said plate, is an arm 172 slotted to engage an eccentric 173 secured to the shaft 27. The shaft 27, it will be recalled, makes a complete rotation at each operation of the machine, and the mechanism just described is so proportioned and connected that at each rotation the pawl 164 will be operated to impart a step of movement to the ratchet disk 163 and the roller 156.

The impressions are taken from the consecutive number, date and item carriers by two percussion hammers, one for the consecutive number, and the other to print the date and amount. The consecutive number hammer 175, Figs. 6, 8 and 10, has a hub 176 loose on a rod 177. At its forward end it carries an adjustable impression block 178 of rubber or other suitable material and of sufficient length to take an impression from all three of the consecutive number type carriers. The impression hammer 181 for printing from the rest of the type carriers is substantially the same as the consecutive type hammer, and has a hub 182 loose on the rod 177. At its forward end the hammer 181 carries an impression block which is not shown in the drawings, but is the same as the impression block 178 previously described, except that it is enough longer to print from all of the date and item printing type carriers.

Printing movement is imparted to the impression hammers by an arm 184 pivoted on the rod 177 between the impression hammer hubs 176 and 182. The forward edge of the arm 184 has a shoulder 185 engaging a rod 186. Near its lower end the arm 184 carries a stud 187 in the plane of rotation of a cam 188 fastened to the rotation shaft 27. During the rotation of the shaft the cam will act against the stud 187 to swing the arm 184 against the tension of a spring 189 until the cam passes out of engagement with the stud whereupon the spring 189 will snap the arm 184 forward until it is arrested by the rod 186. The arm 184 has a portion 192 extending at right angles to its length and engaging a stud 193 on each of the hammer arms. As best shown in Fig. 8, the hammers normally rest with their studs in engagement with the right angle portion 192 of the impression hammer operating arm 184 and in this normal position the impression blocks in the hammers are at some little distance from the type carriers. When the hammer operating arm 184 is swung by the cam 188 the hammers will follow and when the cam releases the arm both of the hammers will be thrown against their type carriers to take impressions.

The mechanism previously mentioned whereby the impression hammer 175 may be prevented from printing or by which under certain conditions both hammers may be disabled performs its function by movement of the hammer or hammers toward the type carriers far enough to carry the studs 193 out of engagement with the normally coacting portion 192 on the hammer operating arm 184 and holds them in that position. With this in view the consecutive number hammer head is provided with a stud 195, Fig. 6, and the other hammer with a stud 196, (Fig. 8). Attached to the shaft 141 is a pair of arms 197 and 198, (see also Fig. 11). The arm 197 has an extension 199 having a cam surface 200 to engage the stud 195 while the arm 198 has a similar extension 201 and cam surface to engage the stud 196. Secured to the shaft 141 is a controlling lever 205 which, as shown in Fig. 1, is adjustable to three positions, marked respectively, Check, Lock and Slip. The construction and relation of the parts is such that when the controlling lever 205 is at the check position neither the stud 195 or the stud 196 will be engaged by the cam surfaces on the arms 199 and 201 and the hammer operating arm 184 will, when it snaps forward, impart printing movement to both of the hammers. When the controlling lever 205 is moved to the lock position the cam surface on the arm 201 will be brought into engagement with the stud 196 on the date and amount hammer 181 and the cam surface 200 will be brought into engagement with the stud 195 on the consecutive number hammer 175. The cam surfaces are so graduated that they will act against their associated studs to move the hammers towards the type carriers far enough to hold the studs 193 on the hammers out of engagement with the operating portion 192 of the hammer operating arm 184. As a result neither of the hammers will be operated to make an impression.

When the lever 205 is moved to the slip position the cam surface on the arm 201, which surface is comparatively short, will be carried past the associated stud 196 while the cam surface 200 of the arm 201 will, because of its greater length, remain in engagement with the stud 195 and hold the consecutive number hammer 175 in its inoperative position, and when the hammer operating arm 184 is released by the cam 188 only the date and amount hammer 181 will print.

The checks printed and issued by the machine are drawn from a roll 206 (Figs. 6 and 8) of paper or other suitable material, loosely supported by a stud 207. The strip passes from the roll 206 between plates 208 and 209, Fig. 12, moving together and slidably supported at the rear end by a plate 210, attached to the machine casing. At its forward end the plates are supported by a rod 211 engaging slots at the upper ends of the arms 197 and 198 previously mentioned. As shown in Fig. 13, between the two plates is a leaf spring 212 which acts with the upper plate 209 to provide a tension device for preventing accidental movement of the paper relative to the plates. As previously pointed out, the arms 197 and 198 are moved by operation of the control lever 205 and owing to the engagement of the arms with the rod 211 any movement of the control lever and arms will be transmitted to the check paper table or chute and this movement owing to the tension spring 212 will serve to shift the check strip. The purpose of this shifting movement of the strip will be pointed out later on.

In most places of business, checks, or, as they are sometimes called, receipts, will be required in by far the larger number of transactions entered in the machine. When a check has been fully ejected by operation of the mechanism it is torn off from the strip, the rear edge 213 of the plate 209 serving satisfactorily as a tearing guide. The next check to be issued will therefore have one end adjacent the tearing edge 213 and will rest between a roller 214 and a roller 215 having on its periphery type for printing any desired matter. In the present machine the type is designed to print the name and address of the proprietor. The rollers 214 and 215 are geared together and are driven by movement of the check feeding lever 146. The feeding lever carries a segmental rack 216 which, during movement of the lever will engage a gear 217 loosely mounted on an arm 218 loose on the shaft 219 which supports the roller 214. A spring 220 (Figure 7) acts upon the arm to hold it in engagement with a pin 222. When the handle 147 is swung rearward the rollers 214 and 215 will be given a complete rotation and during the return movement the teeth of the gear 217 will ratchet over the teeth 216, because the rollers and the gear 217 will be held against reverse movement by a locking pawl 225, Figs. 8 and 9, integral with an arm 226 connected by a spring 227 with a pin 228 on the machine frame.

A full stroke mechanism is provided to compel a complete movement of the lever 146 and its handle 147 in both directions. This full stroke mechanism comprises a plate 233, Fig. 7, attached to the feeding lever or handle and concentric with the teeth 216. Pivotally supported on a stud 234, (see also Fig. 9), is a short arm 235. As the segment 233 travels to the right, Fig. 7, the arm 235 will be swung slightly on its pivot and then act with the notches in the segment to prevent reverse movement of the handle. At the end of the check feeding stroke of the handle the arm 235 will drop in front of the rack 233 and then during the forward movement of the handle will be swung the other way and co-operate with the rack to prevent movement of the handle in the other or feeding direction until after the movement back to its normal starting point has been completed.

The feeding lever 146 and the shaft 27 are provided with co-acting means preventing operation of the keys if the feeding handle 147 is shifted from its normal or home position, and which will, on the other hand, prevent movement of the feeding handle if a key has been partially depressed and the shaft therefore given partial rotation. In the present embodiment this co-acting means consists of a lug 236, Fig. 8, extending laterally from the side of the feeding lever or handle and a disk 237 fastened to the shaft 27. When the shaft is in its normal position, the position in which it is shown in the figure last mentioned, a cutaway portion 238 will be in the path of the lug 236. This cutaway portion is concentric with the shaft 46 and when the feeding handle is operated the lug 236 will travel down until it is arrested by the portion 241 on the disk. It is apparent that rotation of the shaft 27, and, of course, operation of all of the operating keys of the machine will be prevented until the feeding handle is returned far enough to carry the lug 236 out of the path of the portion 238 of the locking disk. It will also be apparent that when the shaft begins its rotation the periphery of the disk 237 will be carried under the lug 236, thereby preventing any movement of the feeding handle 147 until the rotation of the shaft 27 is nearly completed.

In addition to the machinsm just described whereby the operation of the feeding handle 147 is prevented after the rotation shaft 27 has begun its movement, and vice versa, the machine has mechanism for controlling the sequence of operation of the keys and feeding handle. This mechanism is best shown in Figs. 6 and 8. In both figures the parts are all shown in the positions they occupy after an operation of the keys with the machine in check printing condition. At this stage the shaft 27 is held against rotation by a shoulder 242 on a disk 243 attached to the shaft engaging a lug 244 on an element 245 pivoted at 246 to the side of a lever 247 journaled on the rod 186. A spring 248 tends at all times to rock the element 245 in a clockwise direction on its supporting pivot. This engagement of the lug 244 from the shoulder 242 is effected by rocking the lever 247 on its pivot 186 thereby swinging the lower end of the lever and the element 245 far enough to release the disk 243 and shaft 27.

This movement of the lever 247 is imparted during the return stroke of the feeding handle 147. The means for effecting it comprises an arm 251, see also Fig. 9, rigid with the full stroke arm or pawl 235 and provided with a stud 252 extending into an open slot 253 in the upper end of the lever 247. The slot is of sufficient width to permit an idle movement of the arm 251 and stud 252 during the feeding movement of the handle 147, but when the return movement of the handle begins and the full stroke rack 233 engages and swings the pawl 235 and the arm 251 counterclockwise the stud 252 engages the forward side of the slot 253 and rocks the lever 247 far enough to disengage the locking lug 244 from the shoulder 242. When the lug and shoulder become disengaged the spring 248 will swing the element 245 until it is arrested by the engagement of a lug 255 thereon with a shoulder 254 on the lever 247. In this position the locking lug 244 will rest upon the periphery of the disk 243, thereby holding the lever 247 in such a position that the rear side of the slot 253 will be in engagement with the stud 252 and hold the full stroke pawl 235 in a position where it will block the rearward or check-feeding movement of the full stroke rack 233 and, of course, the feeding handle or lever.

After the feeding handle 147 has been given a full to and fro movement to feed a check, and the shaft 27 freed for rotation, the keys may be depressed to register the next item. During this registration the shaft 27 will be given its usual complete rotation. Near the end of its rotation the shoulder 242 will engage the locking lug 244 and swing the element 245 to the position in which it is shown. Movement beyond this position is prevented by engagement of the locking lug 244 with a shoulder 261.

During rush hours it may be desirable to be able to use the registering keys without being compelled to operate the check feeding handle 147 and no operation of the handle is required in printing upon an inserted sales slip. It is necessary therefore to be able to disengage the locking lug 244 from tne shoulder 242 and hold them disengaged when the printing is discontinued or when the machine is changed from check printing to sales slip printing condition. The mechanism for doing this includes a link 262 slotted at one end to engage a stud 263 on the lever 247 and pivoted at its other end to the arm 198. As previously pointed out this arm 198 is attached to the shaft 141 and therefore moves with the printer controlling lever 205. When the lever 205 is moved from the check position in which it is shown in all of the drawings to the lock position 264, Fig. 1, the link 262 will draw the upper end of the lever 247 forward and disengage the locking lug 244 from the shoulder 242. Movement of the controlling lever 205 still further to the slip printing position 265 will result in added movement of the lever 247, and thereby simply carry the locking lug 244 still further away from the path of the shoulder 242. It is clear, therefore, that with the controlling lever 205 set at either the locking position 264 or the slip printing position 265 the keys and the rotation shaft 27 driven thereby are all free for operation without its being necessary to manipulate the check feeding handle 147.

In addition to its other functions, the printer controlling lever 205 also controls a lock for preventing any movement of the feeding handle 147 when the controlling lever is in either the lock or the slip position. This lock includes an arm 266 secured to the shaft 141 and provided with a slot 267 which is so constructed that it will engage a stud 268 on the side of the feeding lever 146 when the controlling lever 205 is moved to either the lock or the slip position. Normally, that is, when the lever 205 is at the check position, the stud 268 will travel along the curved edge 271 of an extension 272 of the arm 266. The purpose of the extension 272 is to prevent shifting the controlling lever 205 to either the lock or the slip position if the check paper feeding handle 147 is away from its normal starting position, as any attempt to move the controlling lever will then be opposed by engagement of the extension 272 with the stud 268.

When the machine is to be used to print upon a sales slip it is necessary to shift the printer controlling handle 205 to the slip position before the slip can be inserted. This insures locking the check feeding handle 147, disabling the consecutive number printing hammer and releasing the interlocking mechanism. The sales slips are to be inserted into a slot 274 far enough to bring between the type carriers and impression hammer the portion of the slip upon which the impression should fall. When the printer controlling lever 205 is at either the check or the lock position an element 275 (Figure 6) pivoted on the rod 219 is held with a portion 276 in position to obstruct the slot 274. Referring to Fig. 11 it is seen that the element 275 is positioned to the left of the slot for receiving the check strip and therefore it cannot interfere with the passage of said strip at any time. Slot 274 being wider in breadth than the check strip passage, and overlying the same, is adapted to receive portion 276 of member 275 when the same is moved upwardly to sales slip obstructing position. Said member is held in that position by a stud 277 on the side of the arm 197 engaging a cam slot 278 at the forward end of the element 275. When the lever 205 is moved to the slip position the stud 277 and slot 278 will cooperate to lower the element 275 far enough to remove the obstruction from the slot and thereby permit the insertion of the sales slip.

When the control lever 205 is moved to the slip position, the check paper table 208 is given the movement above described to draw the check paper back from between the rollers 214 and 215. As will be seen in Fig. 8, the rollers are cut away so that at their normal positions this movement of the paper is permitted. The purpose of so moving or shifting the check paper is to afford a means whereby, if the keys of the machine should be operated with the lever 205 at the slip position and without a slip having been inserted, the resulting impression will be made on the check at a point where it will be covered up or obliterated by a subsequent impression from the type on the roller 215. The way in which such an incorrect impression is overprinted is illustrated at 279, Fig. 14. The size and configuration of the type on the roller 215 may, if desired, be designed so that an impression from them will dominate and substantially conceal the presence of the impression from the other type. When the lever 205 is shifted back to the check position and the check paper restored to its normal position, the subsequent operation of the keys will print as shown at 280, Fig. 14.

The casing of the machine is provided with a hinged door 281, Fig. 1, with a transparent portion to permit readily determining the amount of check paper still in the machine. The left side of that part of the casing containing the check and slip printing mechanism has an opening 283, Fig. 2, normally closed by a plate 284 secured to a lid 285 (see also Fig. 1) hinged as at 286. In the Fuller machine the lid 285 may be opened to permit replenishing the supply of paper in the printing mechanism without giving access to the totalizing and totalizer clearing mechanism.

When the new roll of check paper has been placed on the stud 207 the lid 285 may be raised, thereby carrying with it the plate 284 from over the opening 283. The end of the check strip may then be drawn through the opening and moved edgewise into position between the plates 208 and 209.

In describing the construction of the improved machine it has been necessary incidentally to describe the operation of the various features to such an extent that it is thought that the usual summary of the operation of the machine may be omitted.

While the embodiment herein shown and described is well adapted to fulfill the objects above stated, it is not the intention to limit the invention to the one form, as it is capable of various modifications and changes all coming within the scope of the claims which follow.

What is claimed is:—

1. In a machine of the class described, the combination with a printing mechanism constructed to print items upon checks or upon sales slips inserted into the mechanism, of devices for preparing the printing mechanism for printing upon checks or upon inserted sales slips, and means set in preparing the printing mechanism for check printing whereby insertion of a sales slip is prevented.

2. In a machine of the class described, the combination with a printing mechanism constructed to print items upon checks or upon sales slips inserted into the mechanism, of devices including an adjustable lever for preparing the printing mechanism for printing upon checks or upon inserted sales slips, and means set by adjustment of the lever in preparing the printing mechanism for check printing whereby insertion of a sales slip is prevented.

3. In a machine of the class described, the combination with a casing provided with a slot to receive inserted sales slips, of printing mechanism within the casing for printing and issuing checks or printing upon sales slips, devices including a manually adjustable lever for adjusting the printer to print upon checks or upon sales slips and devices controlled by the lever at one position thereof for preventing the issue of checks or the insertion of sales slips.

4. In a machine of the class described, the combination with a casing provided with a slot to receive inserted sales slips, of printing mechanism within the casing to print and issue checks or print upon the inserted sales slips, devices for changing the printer from check printing condition to sales slip printing condition and restoring same to the check printing condition, an obstruction preventing the insertion of a sales slip when the printer is in check printing condition, and means for withdrawing said obstruction as an incident to conditioning the printing mechanism for printing upon the sales slips.

5. In a machine of the class described, the combination with operating keys, of differentially adjustable type carriers and means for adjusting them by operations of the keys, a rotatable shaft and means requiring rotation of said shaft for taking impressions from the type carriers, mechanism for printing additional matter upon record material bearing the type carrier impressions and feeding said material to accessible position, a guide constructed to receive sales slips inserted to receive impressions from the type carriers, means movable into and out of position to prevent insertion of sales slips, a manually adjustable lever and connections for moving said means, and a lock connected to be set by adjustment of said lever to prevent feeding of the record material.

6. In a machine of the class described, a printing mechanism comprising a differentially adjustable type carrier, manipulative devices, means controlled by the manipulative devices for adjusting the type carrier and taking impressions therefrom, manually operable means for feeding record material carrying said impressions, interlocking devices controlling the sequence of operation of the manipulative devices and manually operable means, and means for enabling and disabling said interlocking devices.

7. In a machine of the class described, a set of type carriers including carriers for printing consecutive numbers, impression devices comprising a separate impression member for the consecutive number type carriers, an invariably moved member for imparting printing movement to the consecutive number impression member, a device for moving the impression member toward the consecutive number type carriers and out of contact with its operating member, and a lever and connections controlling said device.

8. In a machine of the class described, type carriers for printing different kinds of data upon the record material, a plurality of impression hammers, spring actuated means for imparting printing movements to the hammers, devices for determining the data to be printed, cams for holding the hammers out of contact with their actuating means, and connections whereby the determining devices control the cams.

9. In a machine of the class described, type carriers for printing different kinds of data upon record material, a plurality of impression hammers, spring actuated means for imparting printing movements to the hammers, devices for determining the data to be printed, cams for moving the hammers toward the type carriers and out of contact with the actuating means and connections whereby the determining devices actuate the cams.

10. In a machine of the class described, the combination with keys, of a set of type carriers, connections actuated by the keys for adjusting the type carriers to represent the keys actuated, check printing mechanism comprising means for taking impressions from the type carriers and devices for printing additional matter on the receipts and feeding them from the printing mechanism, manually operable mechanism for actuating said devices, a guide constructed to receive sales slips inserted to receive impressions from the type carriers, interlocking mechanism effective to compel alternating operation of the keys and the manually operable devices in check printing, a lever adjustable to a plurality of positions, and connections whereby adjustment of the lever controls the operation of the aforesaid impression taking means and of the manually operable devices.

11. In a machine of the class described, the combination with amount determining devices, of differentially adjustable type carriers, mechanism controlled by the amount determining devices for adjusting the type carriers to set up various amounts, a rotatable shaft, means requiring rotation of the shaft for taking impressions from the type carriers, a locking element secured to the shaft, a locking device movable into and out of engagement with said element, means normally rendered effective by a complete rotation of the rotatable shaft for engaging the locking device with the locking element, mechanism operable after the rotatable shaft has returned to its starting point for printing upon and feeding the record material carrying the impressions from the type carriers, connections whereby operation of said mechanism will disengage the locking device from the locking element, and means cooperating with the locking device for preventing a second operation of the aforesaid mechanism until an intervening operation of the amount determining devices is effected.

12. In a machine of the class described, a plurality of groups of keys, a type carrier for each group, connections driven by keys for adjusting the type carriers to represent the keys actuated, a casing, check printing mechanism in said casing comprising means for taking impressions from the type carriers and rollers for printing additional matter on the checks and feeding them through an opening in the casing, manually operable mechanism for driving said rollers, a slot in the casing constructed to receive sales slips inserted to receive impressions from the type carriers, interlocking mechanism normally effective to compel alternating operation of the keys and the roller driving mechanism, an adjustable lever, and connections whereby the roller driving mechanism may be locked and the interlocking mechanism rendered ineffective by adjustment of said lever.

13. In a machine of the class described, the combination with a keyboard, of a set of type carriers, connections controlled by the keyboard for setting the type carriers to record the various manipulations of said keyboard, a casing, check printing mechanism in said casing comprising means for taking impressions from the type carriers and rollers for printing on the checks and feeding them through an opening in the casing, a manually operable mechanism for driving said rollers, a slot in the casing constructed to receive sales slips inserted to receive impressions from the aforesaid type carriers, interlocking mechanism normally effective to compel alternating operation of the keyboard and the roller driving mechanism, and manipulative means for locking the manually operable mechanism and rendering the interlocking mechanism ineffective when a sales slip is to be printed upon.

14. In a machine of the class described, the combination with a plurality of keys, of a set of type carriers, connections controlled by the keys for setting the type carriers to record the various manipulations of the keys, a casing, receipt printing mechanism in said casing comprising means for taking impressions from the type carriers, and rollers for printing additional matter on the receipts and issuing same through an opening in the casing, a manually operable handle and connections for driving said rollers, a slot in the casing constructed to receive sales slips inserted to receive impressions from the aforesaid type carriers, devices normally compelling alternating operation of the keys and the manually operable handle to print and issue receipts, and manually adjustable devices for locking said handle and freeing the keys for successive operation to print upon sales slips.

15. In a machine of the class described, the combination with a plurality of keys, of a set of type carriers, connections controlled by the keys for setting the type carriers to record the various manipulations of the keys, a casing, check printing mechanism in said casing comprising means for taking impressions from the type carriers and rollers for printing additional matter on the receipts and issuing same from an opening in the casing, a manually operable handle and connections for driving said rollers, a slot in the casing constructed to receive sales slips inserted to receive impressions from the aforesaid type carriers, a device movable into and out of position to prevent insertion of a sales slip, a lever and connections for effecting movements of said device, and a lock for the manually operable handle controlled by said lever.

16. In a machine of the class described, the combination with a printing mechanism constructed to print upon and feed checks or print upon inserted sales slips, of manipulative devices for preparing the printing mechanism for printing and issuing checks or printing upon inserted sales slips, and means set in preparing the printing mechanism for check printing whereby insertion of a sales slip is prevented.

17. In a machine of the class described, the combination with item entering mechanism, of manually operable check strip feeding mechanism, means operated by the item entering mechanism for printing upon the check strip, interlocking mechanism normally requiring alternating operation of the item entering mechanism and the check feeding mechanism, and devices whereby the interlocking mechanism may be rendered effective or ineffective as desired.

18. In a machine of the class described, the combination with differential mechanism and keys controlling same, of manually operable check strip feeding mechanism, means operating as an incident to the operation of the differential mechanism for printing upon the check strip, interlocking mechanism normally requiring operation of the differential mechanism and the feeding mechanism in a fixed sequence, and controlling mechanism whereby the interlocking mechanism may be disabled.

19. In a machine of the class described, the combination with keys each having an invariable extent of movement, printing mechanism controlled by the keys for printing upon check material characters designating the keys operated, a main operating mechanism, check-issuing devices operated independently of said operating mechanism comprising a handle having an invariable extent of movement, and co-acting devices whereby an incomplete movement of a key will prevent movement of the check issuing handle and whereby an incomplete movement of the handle will prevent movement of a key.

20. In a machine of the class described, the combination with a set of keys, of type carriers for printing upon check material characters representing the keys operated, a rotatable shaft, means requiring operations of keys and rotation of the shaft for setting the type carriers and taking impressions therefrom, check-issuing devices comprising a manually operable handle, means movable with said handle for preventing rotation of the shaft, and means on the shaft for preventing movement of the handle when the shaft is out of a certain position.

21. In a machine of the class described, the combination with a set of keys, of type carriers for printing upon check material characters representing the keys operated, a rotatable shaft, means requiring operation of the keys and rotation of the shaft for setting the type carriers and taking impressions therefrom, manually operable check-issuing mechanism, and devices intermediate the shaft and said mechanism whereby operation of the mechanism is prevented when the shaft has been rotated away from a certain position and rotation of the shaft is prevented by an incomplete operation of the feeding mechanism.

22. The combination with a registering mechanism, of an operating mechanism therefor, connections from said operating mechanism for effecting printing upon check material, a check issuing mechanism, an interlocking mechanism to compel a sequence of operation of the registering and check issuing mechanism and a manipulative device for rendering the interlocking mechanism ineffective.

23. In a machine of the class described, the combination with a registering mechanism, of an operating mechanism, connections from said operating mechanism for effecting printing from said registering mechanism, means for automatically locking the latter after each operation, a check issuing mechanism, and means controlled by the check issuing mechanism for unlocking the operating mechanism.

24. In a machine of the class described, the combination with registering devices and a mechanism for selectively printing upon checks or other material, devices for issuing the checks, an interlocking mechanism for compelling alternate operations of the registering and check issuing devices, and means automatically set for disabling the interlocking devices in preparing to print upon material other than checks.

25. In a machine of the class described, the combination with item entering mechanism, of item printing devices operated by said mechanism, a lock for the mechanism rendered effective by an operation of the mechanism, manually operable devices for feeding record material through the printing devices, connections whereby operation of the manually operable devices will render the aforesaid lock ineffective, a lock for the manually operable devices rendered effective by operation of said devices, and means whereby the last mentioned lock is rendered ineffective by an operation of the item entering mechanism.

26. In a machine of the class described, the combination with totalizing mechanism of devices for printing items entered in said mechanism, mechanism comprising a keyboard for operating the totalizing and printing mechanisms, manipulative means for disabling said printing devices, manually driven devices for feeding record material through the printing mechanism, means whereby during an operation of the feeding devices operation of said manipulative means is prevented, and mechanism for compelling alternate operations of the printing and feeding devices effected when the manipulative means is in one of its positions.

27. In a machine of the class described, the combination with a printing mechanism comprising a plurality of impression devices, manipulative devices adjustable to prevent operation of one or both of the impression devices, manually driven mechanism for feeding record material past the impression devices, means whereby during an operation of the feeding devices said manipulative devices will be locked against operation, and mechanism for compelling alternate operations of the impression and feeding devices when operation of neither impression device has been prevented.

28. In a machine of the class described, a totalizer, a series of operating keys, actuating means driven thereby for actuating said totalizer, a series of type elements driven by said actuating means, means operated by said keys for forming a record from said type elements, manual means for advancing the record so formed, and interlocking connections compelling alternate operations of said keys and said manual means.

29. In a machine of the class described, a totalizer, a series of operating keys, actuating means driven thereby for actuating said totalizer, a series of type elements driven by said actuating means, means operated by said keys for forming a record from said type elements, manual means for advancing the record so formed, interlocking connections compelling alternate operations of said keys and said manual means, and a device for rendering said interlocking connections ineffective.

30. In a machine of the class described, a plurality of keys, a totalizer, means under control of said keys for adding amounts in said totalizer, amount printing elements controlled by said keys to designate the amounts added, elements for printing characters other than amounts added, a plurality of impression members for printing from all of said elements, a controlling device for determining whether a check or inserted slip or neither is to be printed upon, means for issuing a printed check, and connections from said controlling device to disable a part or all of said impression means and to render said check issuing means ineffective.

31. In a machine of the class described, a totalizer, means for entering items therein, printing wheels controlled by said item entering means, impression means operated by said item entering means, normally locked manipulative record strip advancing means, and connections between said item entering means and said manipulative means whereby the item entering means when operated unlocks said manipulative means after the impression means has been operated and locks itself, and said manipulative means when subsequently operated unlocks the item entering means and relocks itself.

32. In a machine of the class described, printing mechanism for printing upon a check, an operating shaft, said printing mechanism being directly operated by said operating shaft, item entering means for controlling the printing mechanism, manually operable means for issuing a printed check, and means comprising a single continuous train of mechanism between said check issuing means and said item entering means for enforcing a continuous predetermined sequence of operations of said two last mentioned means.

33. In a machine of the class described, a pair of impression platens, separate and independently operable groups of type elements cooperating with said platens, a common driving element for said pair of platens and a shiftable member adapted in one position to move one of said platens out of driving relation with said common element.

34. In a machine of the class described, a plurality of impression platens, a spring operated pivoted driving member common to said impression platens, a shiftable platen control member, and cooperating projections carried by said platens and said control member whereby said platens may be variously moved out of the driving path of said driving member according to the position of the control member.

35. In a machine of the class described, a plurality of groups of type carriers for printing conjointly on a record material, impression means including a separate impression member for one of said groups, an invariably moved member for imparting printing movement to said separate impression member, a device for moving said separate impression member toward its corresponding group of type carriers and away from its operating member, and a manipulative member for controlling said device.

36. In a machine of the class described, a plurality of groups of type carriers for printing conjointly upon a record material, impression means including a separate impression member for one of said groups, an invariably moved member for imparting printing movement to said separate impression member, a manipulative device for controlling the insertion of a slip for receiving printing impressions, and means whereby said separate impression member is out of operative relation with its operating means when said manipulative device is in slip printing position.

37. In a machine of the class described, type carriers for printing different kinds of data upon record material, a plurality of impression hammers, means for imparting printing movements to the hammers, manipulative means for determining whether check printing or inserted slip printing is to be effected, a cam for holding one of said hammers out of operative relation with its actuating means, and connections whereby said manipulative means controls said cam.

38. In a machine of the class described, the combination with totalizing mechanism, of means for printing items entered in said mechanism, means for operating the totalizing and printing mechanisms, manipulative means for disabling said printing means, manually driven devices for feeding record material through the printing means, means whereby during an operation of the feeding devices operation of said manipulative means is prevented, and mechanism for compelling alternate operation of the printing means and the feeding devices when the manipulative means is in one of its positions.

39. In a machine of the class described, item entering mechanism, a manually operable check strip feeding device, an operating shaft cooperating with said item entering mechanism, a locking element secured to said shaft, locking means cooperating with said element and carried into locking relation with the latter upon a complete operation of said shaft, and means engaged by said check feeding device to carry said locking means out of locking relation with said element.

40. In a machine of the class described, the combination with a registering mechanism and a printing mechanism for printing upon checks or other material, devices for issuing the printed checks, an interlocking mechanism for compelling alternate operations of the registering and check issuing mechanisms, a lever adjustable to three positions, and means cooperating with said lever whereby when said lever is in one position the interlocking devices are rendered effective, when in another position said interlocking devices are disabled and the check issuing device locked, and when in a third position the interlocking devices are disabled and the printing mechanism completely locked against operation.

41. In a machine of the class described, a check feeding mechanism comprising a bent arm, a projection on said arm, a manipulative device for controlling the operation of said check feeding mechanism comprising a bell crank lever, a notch in the lower arm of said bell crank lever adapted to engage the said projection when the manipulative device is moved to a plurality of positions and to disengage said projection when said manipulative device is moved to another position.

42. In a device of the class described, a plurality of groups of independently operable type carriers, impact means for taking impressions from said type carriers, key operated means for adjusting the type in one of said groups of type carriers and actuating said impact means, and a check feeding mechanism for controlling another of said groups of type carriers.

43. In a machine of the class described, the combination with a recording mechanism for printing characters upon a check contained in the machine, and a check issuing device alternately operated, of means cooperating with said mechanisms whereby each mechanism is locked as a result of operation of itself and is unlocked by the operation of the other mechanism, a manipulative device operated when it is desired to print upon other material than issued checks, and means controlled by said manipulative device for disabling said locking means.

44. In a machine of the class described, the combination with a registering mechanism and a printing mechanism for printing upon record material, a main operating mechanism for the registering and printing mechanisms, a plurality of record material shifting devices manually operated independently of said operating mechanism, and means cooperating with the main operating mechanism for requiring that the operation of one of said shifting devices be in sequence with the operation of said operating mechanism and additional means preventing operation of the other shifting device when the first mentioned shifting device is operated.

45. In a machine of the class described, the combination with a registering mechanism and a printing mechanism for printing upon record material, a main operating mechanism for the registering and printing mechanisms, a plurality of record material shifting devices manipulated independently of said operating mechanism, interlocks between said shifting devices and said operating means, the arrangement being such that operation of one of said shifting devices will lock the other device and unlock the said operating mechanism, and operation of the other shifting device will lock the first mentioned device and the main operating mechanism.

In witness whereof I have signed my name hereto this 8 day of March, 1922.

FRED S. HAAS.